US008800036B2

(12) United States Patent
Khayam et al.

(10) Patent No.: US 8,800,036 B2
(45) Date of Patent: Aug. 5, 2014

(54) METHOD AND SYSTEM FOR ADAPTIVE ANOMALY-BASED INTRUSION DETECTION

(75) Inventors: Syed Ali Khayam, Islamabad (PK); Muhammad Qasim Ali, Islamabad (PK)

(73) Assignee: The School of Electrical Engineering and Computer Science (SEECS), National University of Sciences and Technology (NUST), Islamabad (PK)

( * ) Notice: Subject to any disclaimer, the term of this patent is extended or adjusted under 35 U.S.C. 154(b) by 689 days.

(21) Appl. No.: 12/692,165

(22) Filed: Jan. 22, 2010

(65) Prior Publication Data

US 2011/0185422 A1    Jul. 28, 2011

(51) Int. Cl.
   *H04L 29/06*    (2006.01)

(52) U.S. Cl.
   USPC ............. 726/23; 726/22; 726/24; 713/193; 713/194; 713/189; 709/206

(58) Field of Classification Search
   USPC .......................................................... 726/23
   See application file for complete search history.

(56) References Cited

U.S. PATENT DOCUMENTS

| 6,928,549 | B2 | 8/2005 | Brock et al. |
| 7,162,741 | B2 | 1/2007 | Eskin et al. |
| 7,424,619 | B1 | 9/2008 | Fan et al. |
| 8,001,601 | B2 * | 8/2011 | Duffield et al. ................. 726/23 |
| 2004/0205474 | A1 | 10/2004 | Eskin et al. |
| 2005/0044406 | A1 * | 2/2005 | Stute ............................. 713/201 |
| 2005/0251570 | A1 | 11/2005 | Heasman et al. |
| 2006/0117386 | A1 * | 6/2006 | Gupta et al. .................... 726/23 |
| 2006/0129382 | A1 | 6/2006 | Anand et al. |
| 2007/0061882 | A1 | 3/2007 | Mukhopadhyay et al. |
| 2007/0283436 | A1 * | 12/2007 | Duffield et al. ................. 726/23 |
| 2010/0082513 | A1 * | 4/2010 | Liu ................................ 706/46 |

OTHER PUBLICATIONS

"Learning Program Behavior Profiles for Intrusion Detection"; Ghosh et al ;"Proceedings of the Workshop on Intrusion Detection and Network Monitoring" Santa Clara, California, USA, Apr. 9-12, 1999.*

(Continued)

*Primary Examiner* — Jason Lee
(74) *Attorney, Agent, or Firm* — Brown & Michaels, PC

(57) ABSTRACT

The input characteristics of a real-time IDS change continuously with time therefore setting a rigid (time and behavior invariant) classification threshold limits the accuracy that the IDS can potentially achieve. A generic threshold tuning method and system is proposed which can adaptively tune the detection threshold of a real-time IDS in accordance with varying host and network behavior. The method and system perform statistical and information-theoretic analysis of network and host-based IDSs' anomaly based intrusions to reveal a consistent time correlation structure between benign activity periods which is used to predict future anomaly scores and to adapt an IDS' detection threshold accordingly.

14 Claims, 3 Drawing Sheets

(56) References Cited

OTHER PUBLICATIONS

"Probabilistic Techniques for Intrusion Detection Based on Computer Audit Data"; Ye et al; IEEE Transactions on Systems, Man, and Cybernetics—Part A: Systems and Humans, vol. 31, No. 4, Jul. 2001.*

"Anomaly-based network intrusion detection: Techniques, systems and challenges"; Garcia-Teodoro et al; computer and security 2009; 11 pages.*

Lakhina et al. "Mining Anomalies Using Traffic Feature Distributions" SIGCOMM'05, Aug. 22-26 2005.

Jung et al. "Fast Portscan Detection Using Sequential Hypothesis Testing" Proceedings of the 2004 IEEE Symposium on Security and Privacy (S&P'04).

Ingham, Kenneth L. and Inoue, Hajime. "Comparing Anomaly Detection Techniques for HTTP" 2007 conference on Recent Advances in Intrusion Detection.

Agosta et al. "An Adaptive Anomaly Detector for Worm Detection." Proceedings of the 2nd Workshop on Tackling Computer Systems Problems with Machine Learning Techniques (SysML'07) 2007.

* cited by examiner

METHOD AND SYSTEM FOR ADAPTIVE ANOMALY-BASED INTRUSION DETECTION

FIELD OF THE INVENTION

The present invention relates generally to the field of network security, and more particularly to improved adaptive intrusion detection system (IDS) designed for providing security in an enterprise network environment.

BACKGROUND OF THE INVENTION

Due to rapidly evolving network attacks, detection of malicious/unusual traffic patterns in enterprise traffic has become vitally important. As opposed to traditional signature-based schemes that detect known attacks, Intrusion Detection Systems (IDSs) that detect deviation from normal traffic profiles of users, hosts and networks are now becoming increasingly popular. The possibility that the peculiar behavior could be suspicious/malicious is the intuitive rationale that necessitates the need of an IDS. Such detection system comprises of a model characterizing the normal behavior of network traffic. It is then decided as to what percentage of deviant activity must be set as an anomalistic threshold.

Any effective IDS will have to somehow learn a good classification threshold for an arbitrary benign behavior in real-time. To make matters worse, raw data that are input to an IDS typically show considerable variations. Traffic characteristics vary considerably across organizations, network deployment points, and diurnal and other usage patterns. Similarly, host-based anomaly detection metrics are a function of user behavior, applications being used, operating system, hardware, etc. As input data characteristics vary, determination of a fixed threshold requires repeated manual intervention. In a typical operational scenario, a system/network administrator is responsible for adjusting the sensitivity of a network-based intrusion detector when the number of false alarms (i.e., traffic classified as malicious but which is in fact benign) increases. Similarly, host-based IDSs expect a user to adjust its sensitivity to cater for his/her security and behavioral requirements. Such repeated manual input renders an IDS less automated and more prone to configuration errors. Moreover, in a real-time system it is difficult to ascertain if a manually-configured threshold is yielding good accuracy.

In A. Lakhina et al., "Mining anomalies using traffic feature distributions" ACM SIGCOMM, 2005, J. Jung et al., "Fast portscan detection using sequential hypothesis testing", IEEE SSP, 2004 and K. L. Ingham et al., "Comparing anomaly detection techniques for http, RAID, 2007, incorporated herein by reference authors propose some network anomaly detectors which provide methods to calculate optimum thresholds for their specific algorithms. However, most of these studies do not cater for the time varying behaviour of the input and consequently fail to provide acceptable performance under varying traffic conditions. M. Agosta, C. D. Wasser, J. Chandrashekar and C. Livadas, "An adaptive anomaly detector for worm detection", Usenix SysML, 2007 incorporated herein by reference, proposed an anomaly detector which adjusts its threshold according to the variations observed in input. However, no such generic technique is available that can cater for varying input and work with any intrusion detector. Since intrusion detection algorithms are regularly updated in response to evolving attack characteristics, it is reasonable to assert that a practical threshold adaptation technique, instead of being devised for a specific intrusion detection algorithm, should seamlessly operate with any given algorithm. However, a generic adaptive threshold tuning technique that can automatically achieve a suitable operating point on the ROC plane for any existing real-time anomaly detector is not available.

The present invention proposes an IDS which automatically detects varying input data patterns and adjusts its classification threshold accordingly. Such an adaptive thresholding mechanism will enable an IDS to achieve good operational points on the ROC plane. As a by-product, adaptive thresholding also eliminates the need for human threshold tuning, thereby making an IDS more automated. The invention and its embodiments are discussed in detail in the description section of the present disclosure.

BRIEF SUMMARY OF THE INVENTION

The present invention puts forth a method and system for adaptive anomaly-based intrusion detection. As the input characteristics of a real-time IDS change continuously with time therefore setting a rigid (time and behavior invariant) classification threshold limits the accuracy that the IDS can potentially achieve. A generic threshold tuning method and system is proposed which can adaptively tune the detection threshold of a real-time IDS in accordance with varying host and network behavior. The method and system perform statistical and information-theoretic analyses of network and host-based IDSs' anomaly based intrusions to reveal a consistent time correlation structure between benign activity periods. The method and system is used to predict future anomaly scores and to adapt an IDS' detection threshold accordingly. The method and system allow an IDS to achieve high accuracy points. The system reduces the need for human threshold configuration in an IDS and also has very low run-time complexity and memory requirements. The proposed adaptive thresholding method and system can be readily introduced into multiple prominent network and host-based IDSs.

DETAILED DESCRIPTION OF THE INVENTION

Figure 1:
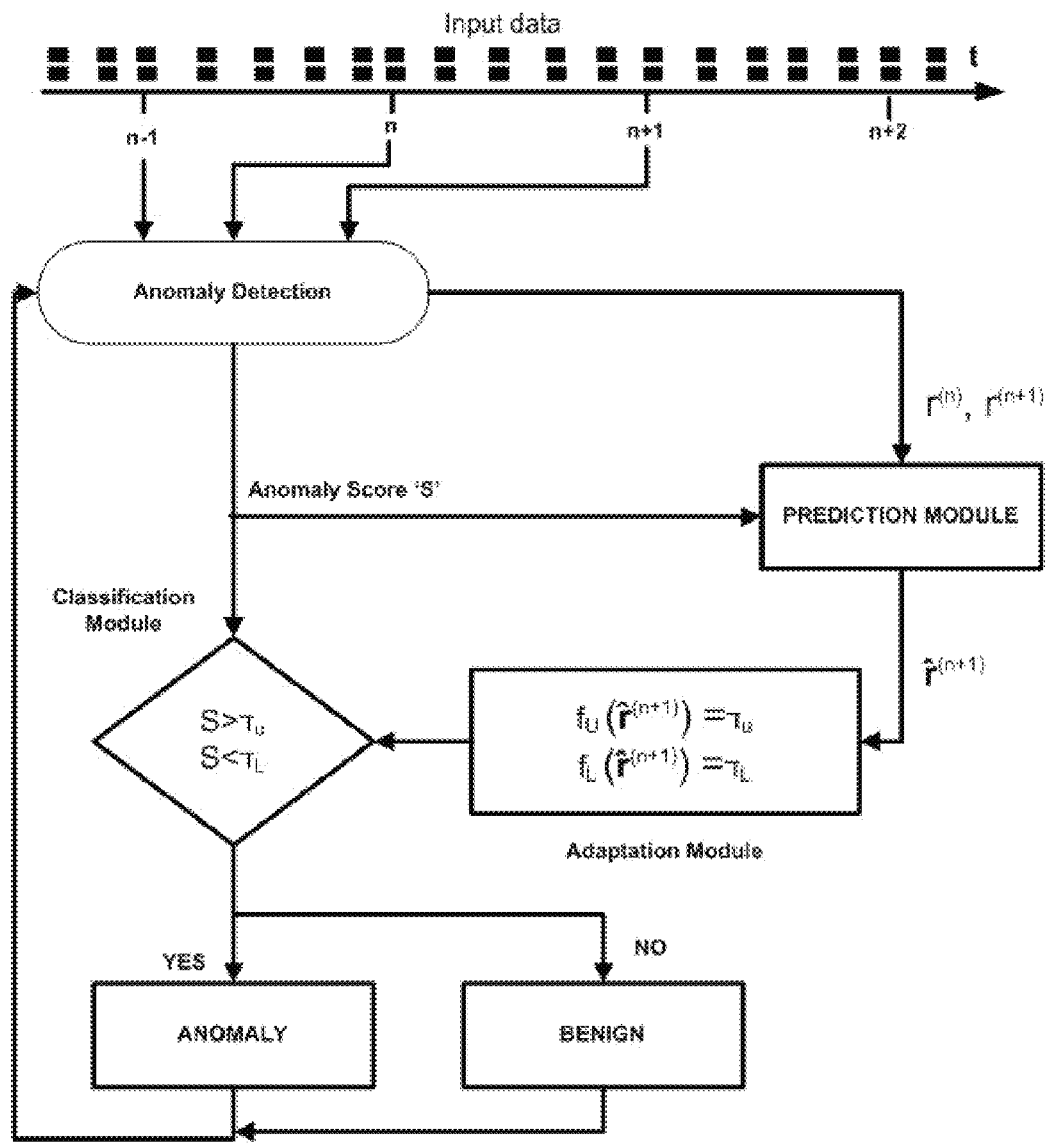
FIG. 1 illustrates the system for adaptive anomaly-based intrusion detection

For any real time IDS, input traffic pattern changes considerably. Thus setting a fixed (time- and behavior-invariant) classification threshold cannot possible achieve good accuracy for such time-varying input.

A pertinent observation to this end is also that significant variations in input data characteristics are difficult to track. Instead, it is much easier to track the anomaly score of an IDS before application of the thresholding function. Hence, anomaly scores are easier to track because they reduce the high-dimensional input data to a relatively small set of scores. In addition to the complexity advantage, since these scores are coherent with input data characteristics, and as these scores comprise the domain of the thresholding function, it is intuitively likely that adaptively tracking anomaly scores yields better accuracy than direct tracking of input data. The rationale for the adaptive thresholding proposed in the present invention is to accurately predict the expected values of future anomaly scores under benign conditions and the detection threshold shall be adapted as a function of predicted score.

Tracking IDS' anomaly scores necessitates a robust model based on their statistical properties. As long as an IDS' input data are produced by a benign source, the anomaly scores observed at the output of an IDS exhibit a certain level of temporal dependence. In case of an anomaly, perturbations in this dependence structure are flagged as anomalies. Therefore, the level of temporal dependence serves as an important metric for modeling anomaly scores.

In the embodiment of present invention, the temporal dependence among anomaly scores has been analyzed using autocorrelation functions. A high level of temporal dependence is observed for all the IDSs. This correlation decays in time and eventually drops to a negligible value. Also, the correlation decay is not consistent for all ADS's.

This decaying temporal dependence structure can be accurately modeled using Markov chain or a Kalman Filter or a Holt-Winters predictor whereby the said stochastic model of anomaly scores can in turn be used for threshold prediction as well. In the embodiment of present invention the stochastic modeling of decaying temporal dependence has been done using Markov Chain. The order of Markov chain that should be used to predict the next anomaly score is an imperative metric to be known to constrain the complexity of threshold adaptation. In order to determine the Markovian order, conditional entropy based measure is used.

To identify the order of correlation presence in the IDS scoring random process, a Markov chain based stochastic model is defined. The score at discrete time instance n represents the realization of a random variable derived from a stochastic process $X_n$. This process is a Markov chain if it satisfies the Markov property defined as $$Pr\{X_n = j \mid X_{n-1} = i, X_{n-2} = i_{n-2}, \ldots, X_0 = i_0\} \quad (2)$$

$$= Pr\{X_n = j \mid X_{n-1} = i\} = p_{X_n = j \mid X_{n-1} = i}. \quad (3)$$

In other words, the probability of choosing a next state is only dependent on the current state of the Markov chain. In the present context, a Markov chain model $X_n$ can be defined for an IDS' scores by dividing all possible values of the score in multiple non-overlapping bins. Each bin then represents a state of the Markov chain, while the set of all bin indices $\psi$ is its state space. Based on this state representation, a 1-st order Markov chain, $X_n^{(1)}$ can be defined in which each bin represents a state of the random process. The transition probability matrix of the 1-st order Markov chain $P^{(1)}$ can be computed by counting the number of times state i is followed by state j. The resulting $|\psi|$ histograms can be normalized to obtain the state-wise transition probability mass functions (PMFs) as the rows of $P^{(1)}$.

We can find the conditional probability of the 1-st order Markov chain as:

$$H^{(1)} = -\sum_{i \in \psi^{(1)}} \pi_i^{(1)} \sum_{j \in \psi^{(1)}} p_{X_n = j \mid X_{n-1} = i}^{(1)} \log_2 \left( p_{X_n = j \mid X_{n-1} = i}^{(1)} \right), \quad (4)$$

where $\pi_i^{(1)}$ is the average probability of being in state i which is computed by counting the total number of times each state is visited and then normalizing this frequency histogram.

The measure $H^{(1)}$ defines how much average information is remaining in anomaly score $X_n$ when it is predicted using score $X_{n-1}$. If the present score is correlated with scores before $X_{n-1}$, $H^{(1)}$ will be relatively large implying that information about $X_n$ not provided by $X_{n-1}$ is high. In such a case, generalizing the above discussion, we can define a higher l-th order Markov chain, $X_n^{(l)}$, in which each state is an l-tuple $<i_0, i_1, \ldots, i_{l-1}>$ representing the values taken by the random process in the last l time instances. Aggregating multiple time instances in a single state allows us to satisfy the Markov property, and hence a transition probability matrix $P^{(l)}$ can be computed by counting the number of times $<i_0, i_1, \ldots, i_{l-1}>$ is followed by state $<i_1, \ldots, i_{l-1}, i_l>$. The conditional entropy of $X_n^{(l)}$ defined on $\psi^{(l)}$ can then be computed using the same method as (4).

It is observed that $H^{(1)} \geq H^{(2)} \geq \ldots \geq H^{(l)}$, as each older anomaly score can either be independent of or provide some information about the present score. The number of previous scores required to accurately predict the next score can then be determined by plotting $H^{(l)}$ as the function of the Markov chain order, $l=1, 2, \ldots$. The order at which the conditional entropy saturates defines the total number of previous scores which have conveyed as much information of the present score as possible.

In an embodiment of the present invention, a simple and generic Markovian anomaly score predictor is proposed based upon the rationale for anomaly score prediction that the predicted scores can be used to threshold future scores in accordance with varying input characteristics. Under the embodiment of present invention, the varying input traffic to the IDS could be data packets or OS measurements or system call sequences.

To this end an IDS' anomaly score is subdivided into k equal-sized bins, where k is determined as a by-product of the conditional entropy analysis of the last section. Specifically, the Markovian order at which the decaying conditional entropy saturates is chosen as the value of k. The size of each bin is then calculated by taking the difference of the minimum and the maximum anomaly score and dividing that difference by k. The sizes of the first and the last bin are kept flexible to accommodate any previously-unseen anomaly scores that may be observed during real-time operation.

Let $p^{(n)}$ denote the kXk transition probability matrix of the Markov chain predictor at time n, where $P_{ij}^{(n)}$ represents an entry at the $i^{th}$ row and $j^{th}$ column of $p^{(n)}$. Also, let $r^{(n)}$ be the actual value of an ADS score observed at time instance n and let $\hat{r}^{(n)}$ be the Markovian prediction from the last time instance. Then the algorithm for adaptive thresholding operates as follows:

$$\varepsilon^{(n)} = |r^{(n)} - \hat{r}^{(n)}| \qquad \text{Equation 1}$$

$$\tilde{p}_{j^{(n)}_{\pm} \mid i^{(n)}}^{(n+1)} = \varepsilon^{(n)} \times p_{j^{(n)}_{\pm} \mid i^{(n)}}^{(n)}, \forall i = 1, \ldots, \beta, \qquad \text{Equation 2}$$

$$p_{j \mid i^{(n)}}^{(n+1)} = \frac{\tilde{p}_{j \mid i^{(n)}}^{(n+1)}}{\sum_{i=1}^{k} \tilde{p}_{i \mid i^{(n)}}^{(n+1)}}, \forall j = 1, \ldots, k, \qquad \text{Equation 3}$$

$$\hat{r}^{(n+1)} = \max_{j=1,\ldots,k} p_{j \mid i^{(n)}}^{(n+1)} \qquad \text{Equation 4}$$

Equation 1 calculates the prediction error $e^{(n)}$ from the predicted and the observed score. Then, at each time step n, Equation 2 feeds the error $e^{(n)}$ back into $p^{(n)}$ in order to adapt and learn the varying traffic or host patterns. Using this feedback, the weight of a value near the observed value $r^{(n)}$ is increased proportionally. Specifically, a tunable parameter b is used to assign higher probability weights to states close to the current Markov state $r^{(n)}$ by multiplying probabilities of states $r^{(n)}+1, \ldots, r^{(n)}+b$ and states $r^{(n)}-1, \ldots, r^{(n)}-b$ with $e^{(n)}$. Thus higher error means that the probabilities of these states increase proportionally and the predicted anomaly scores for the next time instance will likely drift away from the current state. In practice, we expect that b<<k. The updated row of the transition probability matrix is normalized to obtain a probability mass function for state $r^{(n)}$. Finally, Equation 4 predicts the next anomaly score, $\hat{r}^{(n+1)}$, as the state having the highest probability in the updated transition probability matrix. This predicted anomaly score is used as the adaptive threshold for time instance n+1.

The system for real time intrusion detection in the present embodiment is illustrated in FIG. 1. The values of future anomaly scores are predicted in the Prediction Module based upon the prediction error between the predicted and observed anomaly scores for any time instance n as discussed in the specification of the present invention. The Adaptation Module uses this output in defining prediction based functions as the upper and lower limits of adaptive thresholds $(T_U, T_L)$ for the next time instance say n+1. The Classification Module then checks whether the observed anomaly scores are within the defines of threshold values for n+1 instance and classifies intrusions as possible anomalies accordingly.

In an embodiment of the present invention, network traffic and system call datasets are used. The labeled and publicly available network traffic datasets are the LBNL dataset and Endpoint dataset collected independently at different deployment points. For host-based experiments, widely used and publicly available datasets from UNM and MIT Lincoln lab are used.

The present embodiment uses real-time IDSs for accuracy evaluation. As a practical threshold adaptation algorithm should not be specific to a particular IDS. Therefore, while some IDSs have been selected for proof-of-concept and performance benchmarking, all the analysis and characterization that is provided in the present embodiment is generic and should hold across IDSs. The IDSs used are quite diverse in their underlying detection features and principles. For instance, the network IDSs used in this include simple rule modelling systems like Packet Header Anomaly Detection (PHAD), complex self-learning systems like Maximum-Entropy and pre-programmed Sequential Hypothesis Testing traffic anomaly detectors used by the Threshold Random Walk (TRW) Algorithm. Similarly, on the host side, a simple anomalous sequence detector, a machine learning based detector and an information-theoretic detector have been included. Sequence Time Delay Embedding (STIDE), Support Vector Machines (SVMs) using Bags of System Calls Approach Kullback-Leibler (KL) Detector are the host IDSs used based on the above mentioned principles. This diversity is introduced to show that any real-time IDS, regardless of its functionality, can adapt to the variations in its input in order to provide acceptable performance without the considerable need of manual configuration. All the IDSs used have been trained using 1% of the total data; the remaining 99% is used for testing. For performance benchmarking, the anomaly detection thresholds of all detectors have been changed to generate Receiver Operating Curves (ROC).

Figure 2A:
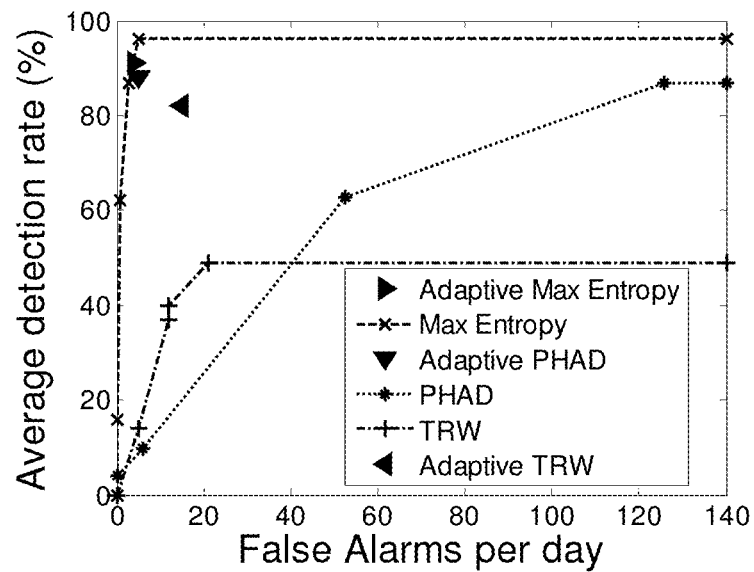
FIG. 2a illustrates accuracy evaluation of network based ADSs using endpoint dataset
Figure 2B:
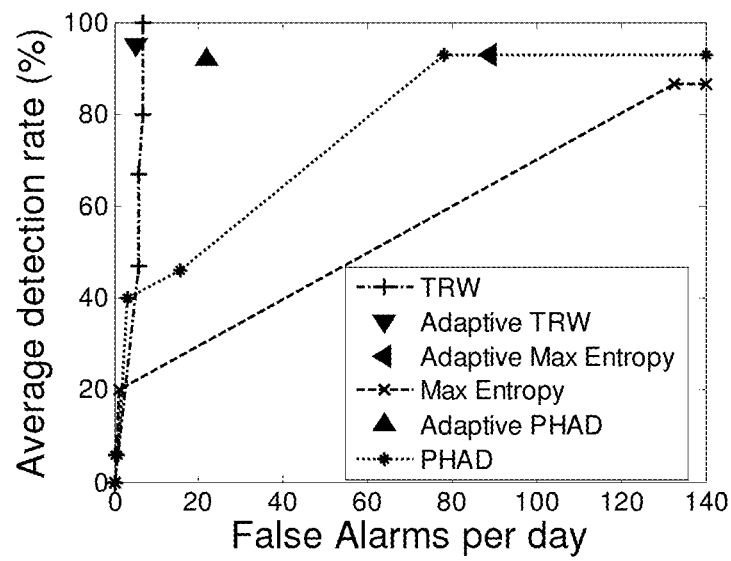
FIG. 2b illustrates accuracy evaluation of network based ADSs using LBNL dataset

FIGS. 2(a and b) show the ROC-based accuracy comparison of the Maximum Entropy, TRW and PHAD detectors with and without adaptive thresholding. It can be clearly seen that for both datasets adaptive thresholding allows PHAD to achieve dramatic accuracy improvements. In particular, PHAD originally had a very high false alarm rates. Adaptive-PHAD prevents the false alarms caused by legitimate change in traffic behavior, thereby inducing a considerable reduction in the ADS' false alarm rate. Significant improvement was not observed for the Adaptive-Maximum-Entropy detector on the endpoint dataset because the original algorithm provided very high accuracy on the endpoints. Nevertheless, the Adaptive-Maximum-Entropy detector provides good operational points on the ROC curve without any human intervention. Maximum Entropy failed to maintain its performance across the LBNL dataset because the erratic traffic variations at an edge router introduces significant false alarms for the Maximum-Entropy detector. Adaptive-Maximum-Entropy detector decreases this false alarm rate. In contrast to the Maximum Entropy detector, TRW provided good accuracy on the LBNL dataset, thus significant accuracy improvements with adaptive thresholding were not observed, albeit good ROC operational points were identified. However, TRW failed to maintain its accuracy for endpoint dataset as it primarily works on the principle of observing incoming requests which were not present in the endpoint dataset. Therefore, on the endpoint dataset Adaptive-TRW provides significant improvements in both detection and false alarm rates.

Figure 3A:
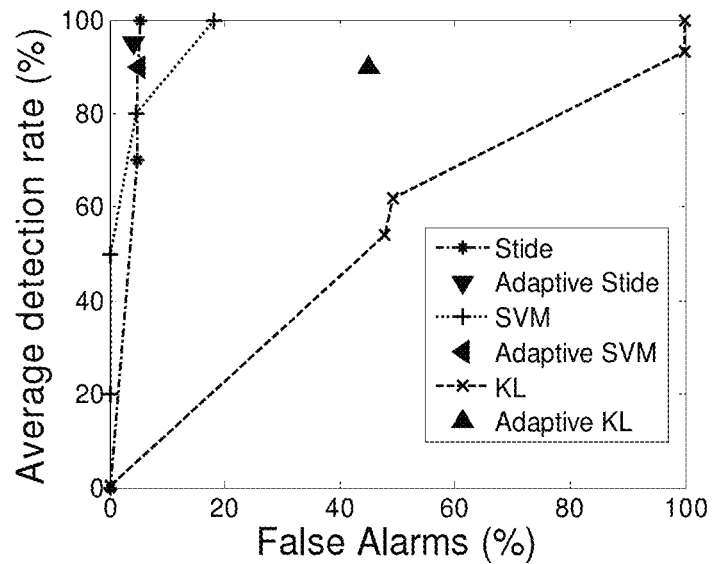
FIG. 3a shows accuracy evaluation of host-based ADSs using UNM dataset
Figure 3B:
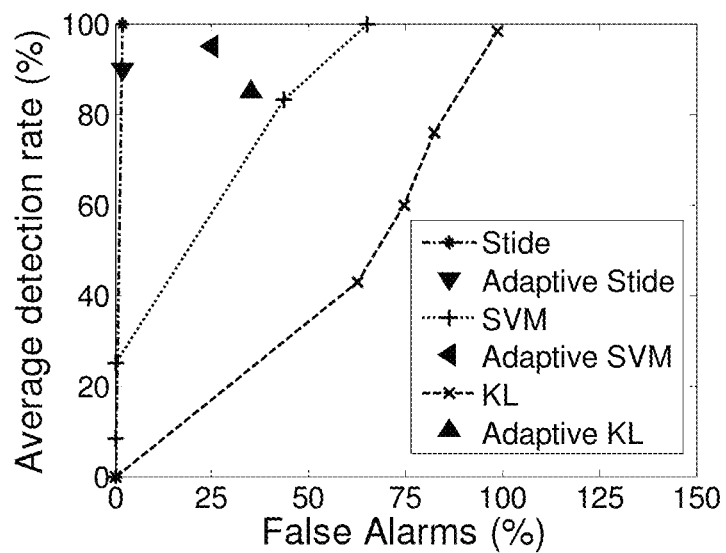
FIG. 3b shows accuracy evaluation of host-based ADSs using MIT Lincoln lab The drawings described herein are for illustration purposes only and are not intended to limit the scope of the present disclosure in any way.

FIG. 3 shows the ROC-based accuracy comparison of Stide, SVM and KL-Divergence detectors with and without adaptive thresholding. It can be observed that Stide gives consistently good performance on both the datasets (i.e., UNM and MIT-LL), thus not providing enough space for improvement. Nevertheless, Adaptive-Stide identifies good accuracy points on the ROC curve without requiring manual configuration. Similarly SVM performed comparatively better on the UNM dataset, but failed to maintain its performance on the MIT-LL dataset. In the MIT-LL dataset case, Adaptive-SVM reduces the false alarms significantly and marginal improvements can also be observed for the UNM dataset. KL-based detector could not perform well on both the datasets, thereby providing enough room for improvement for Adaptive-KL on both the datasets; it can be clearly seen that Adaptive-KL induces a considerable reduction in false alarms on both datasets.

The above description is merely exemplary in nature and is not intended to limit the present disclosure, application, or uses.

What is claimed is:

1. A computer implemented method of intrusion detection in an enterprise network, the method comprising:
   a) developing a prediction model to predict expected values of future anomaly scores from real time anomaly scores based on an output of an anomaly detection system derived from an input of network traffic pattern data of the enterprise network in real time under benign conditions;
   b) setting an adaptive classification threshold based on the expected values predicted by the prediction model; and
   c) classifying unknown observations not within the adaptive classification threshold as possible intrusions;
   wherein the expected values of future anomaly scores ($\hat{r}^{(n+1)}$) are calculated from the equation:

$$\hat{r}^{(n+1)} = \max_{j=1,\ldots,k} p^{(n+1)}_{j|r(n)}, \text{ where}$$

$$p^{(n+1)}_{j|r(n)} = \frac{\tilde{p}^{(n+1)}_{j|r(n)}}{\sum_{i=1}^{k} \tilde{p}^{(n+1)}_{i|r(n)}}, \forall j = 1, \ldots, k, \text{ where}$$

-continued $$\tilde{p}^{(n+1)}_{r^{(n)}\pm i|r^{(n)}} = \varepsilon^{(n)} \times p^{(m)}_{r^{(n)}\pm i|r^{(n)}}, \forall\, i = 1, \ldots, \beta, \text{ where}$$

$$\varepsilon^{(n)} = \left| r^{(n)} - r^{\wedge(n)} \right|,$$

where $p^{(n)}$ is a kXk transition probability matrix of a Markov chain predictor at time n and $r^{(n)}$ is the real time anomaly score at time n.

2. The method of claim 1, wherein the real time anomaly scores exhibit a decaying temporal dependence.

3. The method of claim 1 further comprising predicting the future anomaly scores based on the real time anomaly scores.

4. A computer implemented method of adjusting an adaptive classification threshold in an intrusion detection system, the intrusion detection system using the adaptive classification threshold to identify possible intrusions, the method comprising:
 a) tracking a real time anomaly score based on an output of an anomaly detection system derived from an input of network traffic pattern data of an enterprise network in real time using a stochastic prediction model;
 b) predicting expected values of future anomaly scores from the real time anomaly score of the stochastic prediction model; and
 c) adjusting the adaptive classification threshold based on the expected values of future anomaly scores;

wherein the expected values of future anomaly scores ($\hat{r}^{(n+1)}$) are calculated from the equation:

$$\hat{r}^{(n+1)} = \max_{j=1,\ldots,k} p^{(n+1)}_{j|r^{(n)}}, \text{ where}$$

$$p^{(n+1)}_{j|r^{(n)}} = \frac{\tilde{p}^{(n+1)}_{j|r^{(n)}}}{\sum_{i=1}^{k} \tilde{p}^{(n+1)}_{i|r^{(n)}}}, \forall\, j = 1, \ldots, k, \text{ where}$$

$$\tilde{p}^{(n+1)}_{r^{(n)}\pm i|r^{(n)}} = \varepsilon^{(n)} \times p^{(m)}_{r^{(n)}\pm i|r^{(n)}}, \forall\, i = 1, \ldots, \beta, \text{ where}$$

$$\varepsilon^{(n)} = \left| r^{(n)} - r^{-(n)} \right|,$$

where $p^{(n)}$ is a kXk transition probability matrix of a Markov chain predictor at time n and $r^{(n)}$ is the real time anomaly score at time n.

5. The method of claim 4, wherein the real time anomaly scores exhibit a decaying temporal dependence.

6. The method of claim 4 further comprising predicting the future anomaly scores based on the real time anomaly scores.

7. The method of claim 4 further comprising adjusting the adaptive classification threshold in real time in accordance with real time variations in the network traffic pattern data.

8. The method of claim 1, wherein the prediction model is quantified using a statistical measure and an information theoretic measure.

9. The method of claim 8, wherein the statistical measure is an autocorrelation and the information theoretic measure is a conditional entropy.

10. The method of claim 1 further comprising adjusting the adaptive classification threshold in real time in accordance with real time variations in the network traffic pattern data.

11. The method of claim 4, wherein the prediction model is quantified using a statistical measure and an information theoretic measure.

12. The method of claim 11, wherein the statistical measure is an autocorrelation and the information theoretic measure is a conditional entropy.

13. The method of claim 1, wherein the input of network traffic pattern data is selected from the group consisting of operating system measurements and system call sequences.

14. The method of claim 4, wherein the input of network traffic pattern data is selected from the group consisting of operating system measurements and system call sequences.

\* \* \* \* \*